United States Patent [19]

Elgass et al.

[11] Patent Number: 4,795,929
[45] Date of Patent: Jan. 3, 1989

[54] ROTARY ACTUATOR

[75] Inventors: Manfred Elgass, Kings Park; Vincent A. Colucci, Middle Island, both of N.Y.

[73] Assignee: Logus Manufacturing Corp., Deer Park, N.Y.

[21] Appl. No.: 892,032

[22] Filed: Aug. 1, 1986

[51] Int. Cl.⁴ .............................................. H02K 33/12
[52] U.S. Cl. ...................................... 310/36; 335/230; 335/272; 318/128
[58] Field of Search ........................... 310/36-39, 310/49, 46, 154, 156, 181, 187, 190, 193, 254, 269; 335/272, 229, 230, 234

[56] References Cited

U.S. PATENT DOCUMENTS

| | | | |
|---|---|---|---|
| 3,475,629 | 10/1969 | Lagier | 310/36 |
| 3,626,263 | 12/1971 | McBride | 310/49 X |
| 3,694,782 | 9/1972 | Ray | 335/272 X |
| 3,979,616 | 9/1976 | Stechmann | 310/49 |
| 4,128,825 | 12/1978 | Madsen | 335/272 |
| 4,135,119 | 1/1979 | Brosens | 335/230 |
| 4,287,457 | 9/1981 | Takemura | 310/36 X |
| 4,345,228 | 8/1982 | Idogaki | 310/36 X |
| 4,404,484 | 9/1983 | Gillott | 310/49 |
| 4,506,182 | 3/1985 | Rohdin | 310/190 |
| 4,564,793 | 1/1986 | Reffelt | 310/46 X |

FOREIGN PATENT DOCUMENTS

699614  11/1979  U.S.S.R. ............................. 310/193

Primary Examiner—Patrick R. Salce
Assistant Examiner—Judson H. Jones
Attorney, Agent, or Firm—Bauer & Schaffer

[57] ABSTRACT

A rotary actuator in which there is a freely rotatable permanent magnetic armature between two stators. At least one of the stators produces an asymmetrical magnetic flux field that acts upon the magnetic field of the armature to cause the same to rotate.

21 Claims, 5 Drawing Sheets

ROTARY ACTUATOR

BACKGROUND OF THE INVENTION

The present invention relates to the construction of a rotary actuator also known as a sector motor, in which a rotary element is swingable between a pair of spaced positions, and in particular, to such devices in which the rotary element is latched or held in a selected position after power has been removed therefrom.

Generally, the rotary actuator includes a magnetic armature element surrounded by one or more electromagnetic stator elements each having one or more windings which when driven provide a force field to drive the armature. Reference can be made to such devices as shown in the U.S. Pat. Nos. 3,694,782; 4,227,164; as well as 3,761,851; and 4,500,861. In order to overcome inherent slow speed, the prior art devices have resorted to the use of a large power input to operate the electromagnets and rather large masses of magnetic material to increase magnetic force. Multi-armed armatures with each arm having a winding are used to increase magnetic permeance, as are multi-electromagnets, each operated simultaneously to produce an increased flux pattern. As a result, the prior art devices have been expensive, complex, and generally quite large for the purposes intended.

A manifest need, therefore, exists for small, lightweight, and extremely fast-acting, low-voltage and long-lived motor devices for use in such installations as waveguides and other electro-mechanical systems. It is the object of the present invention to provide such device.

It is another object of the present invention to provide a rotary actuator which is maintained or latched in a given fixed position with or without power being supplied to the electromagnets.

It is an object of the present invention to provide a springless rotary actuator having a fail safe or return latching position, to which the armature automatically returns when electrical drive power is removed.

It is a further object of the present invention to provide an actuator wherein the range of angular movement is sufficiently large to provide for a mechanical advantage and a mechanical movement capable of operating mechanical switches or the like.

It is another object of the present invention to provide an actuator in which chattering, bouncing, and vibration are completely avoided.

These other objects and attendant advantages of the present invention, as well as numerous others, are set forth in the following disclosure.

SUMMARY OF THE INVENTION

According to the present invention a rotary actuator is provided having a permanent magnetic armature with diametrically opposed poles of opposite polarity mounted between a pair of stator elements at least one of which is an electromagnet so as to be rotatable between a first and second position on creation of a selected flux pattern in at least the one electromagnetic stator element. The electromagnetic stator element is constructed so that it produces an asymmetrical flux field which is greater in the vicinity of one of the opposed poles of the armature than in the other.

The electromagnetic stator comprises a core of soft iron material having an inner face opposed to the rotor. A coil is wound on the core so as to provide the core with magnetic field poles on each of the core faces. The asymmetrical flux field is produced by providing the inner face of the core with an enlarged segment which increases the flux field and density in a given area and a smaller field corresponding to the remaining core. Preferably, the enlarged segment of the core face extends about and closely spaced from the surface of the armature for a given arcuate distance.

More particularly the actuator comprises a pair of electromagnetic stators, each having a non-magnetic permeable core and a winding cooperating to provide a first and a second pole. The stators are fixedly mounted in spaced opposition to each other with their poles lying along a common axis of magnetization and are asymmetrically shaped to provide a greater force field to one side of the axis of magnetization than to the other. An armature comprising a cylindrical permanent magnet having opposed first and second poles lying along a diametric polar axis is rotatably mounted between the opposed stators so that the diametric polar axis is initially generally transverse to the axis of magnetization of the stators. An electric circuit is provided to selectively energize the electromagnetic stators so as to induce on the first and second poles of the driven stators, positive and inverse polarity respectively thus causing the force field to attract or to repel the pole of said cylindrical magnet lying on the same side of the axis of magnetization causing the armature to rotate.

The armature is provided with a drive arm, adapted to swing conjointly with the armature rotation. Stop means are provided which limit the swing of the drive arm and switch means are provided actuably by the drive arm reaching its given positions.

In a particular form of the invention, only one electromagnetic stator is employed, the other stator comprising an elongated permanent magnet having on its face adjacent the armature a given polarity causing the armature to be rotatively repelled. Thus, in the absence of any energization of the electromagnet, the armature is automatically repelled into its failsafe latching position.

Full details of the present invention are set forth in the following description and are shown in the accompanying drawings.

DESCRIPTION OF THE INVENTION

The two-pole, two-position latching actuator, embodying the present invention is structurally described with reference to FIGS. 1-5 which is immediately followed by a description of its operation as illustrated in FIGS. 6-10.

As seen in FIGS. 1-5 the two-pole, two position latching rotary actuator, generally depicted by the numeral 10, is formed of a mounting base 12 of a non-magnetic or non-magnetizable material such as plastic, brass or the like. The base 12 is provided with one or more mounting apertures 14 permitting it to be attached by suitable screws or bolts to other working apparatus such as a waveguide, an electronic circuit board, or the like, none of which is illustrated herein.

A freely rotatable cylindrical armature 16 is mounted perpendicularly to the base 12 on a central shaft 18 having stub axles 20 and 22 extending outwardly at each end. The stub axle 20 is journalled in a radial bearing 24 mounted within the base 12 permitting the stub axle 20 to pass completely through the base 12 so as to exit on the opposite side of the base. The stub axle 22 is journalled in a bearing 26 fixed on the frontal closure wall 28 of a barrel-shaped housing 30 formed of a ferrous metal or similar magnetizable material. As will be explained in more detail later, the armature 16 comprises a permanent magnet having diametrically opposed poles of opposite polarity along the axial length of the armature, in a diametric polar axis O.

The barrel-shaped housing 30 is a hollow cylinder open at its end opposite to the closure wall 28 so that it can lie flat against the base 12 concentrically about the armature 16, and is fixed to the base 12 by elongated set screws 32 (FIG. 1) passing through the frontal end wall 28 into threaded engagement with the base 12. This maintains the shaft 18 and the axles 20 and 22 of the armature 16 between the bearings 24, 26 and thereby holds the assembly between the closure wall 28 and the base 12. The closure wall 28 is provided with windows 34, facilitating assembly and observation of the operation of the parts within the housing. Otherwise, the windows 34 are not critical.

Figure 1:
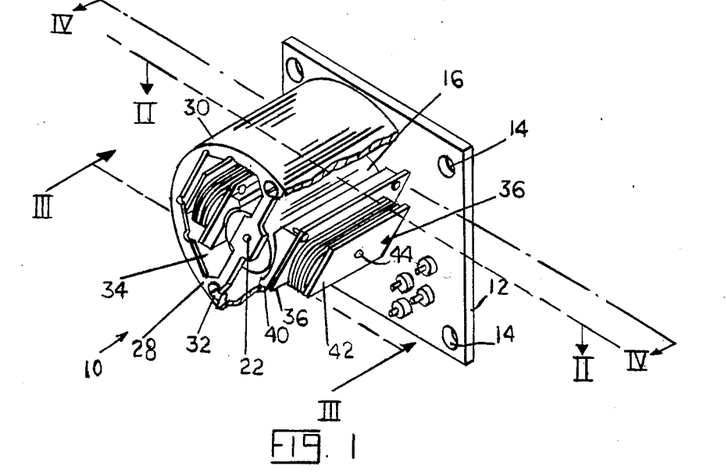
FIG. 1 is a front perspective view, partially broken away showing a two-position latching rotary actuator embodying the present invention.
Figure 2:
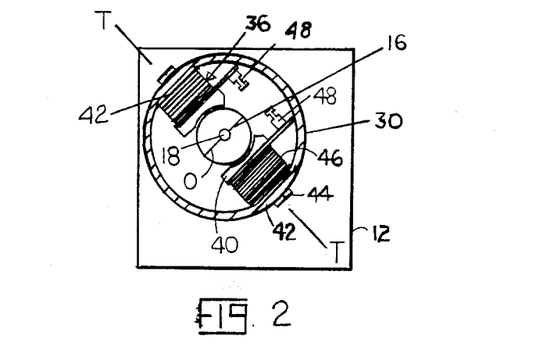
FIG. 2 is a transverse sectional view of the actuator shown in FIG. 1 taken along line II—II of FIG. 1.

A pair of similar electromagnetic stators, generally depicted by the numeral 36 are mounted within the barrel housing 30, along the length of the armature 16 in diametric opposition to the armature 16. Each electromagnetic stator 36 comprises a rectangular core 38 having an inner face 40 spaced closely to the armature 16 and an outer face 42 which is secured to inner wall of the housing 30 by means of one or more screws 44. The core 38 is formed of non-permanent, but magnetizable material such as soft iron extending co-extensively with the length of the armature 16. Each core 38 is surrounded by a coil 46 wound along the length of the core 38 in the longitudinal direction to provide opposing magnetic poles on the respective faces 40 and 42 lying in a common axis of magnetization T which intersects the polar axis O of the armature 16.

Figure 10:
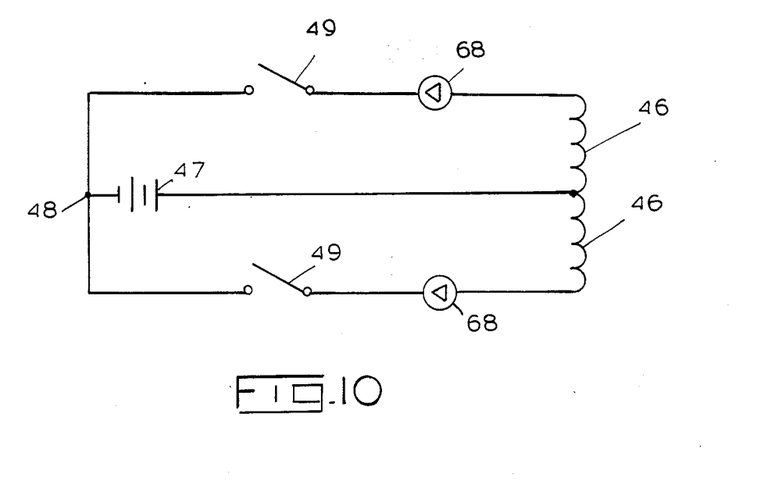
FIG. 10 is a circuit diagram showing the manner by which the actuator is driven.
Figure 11:
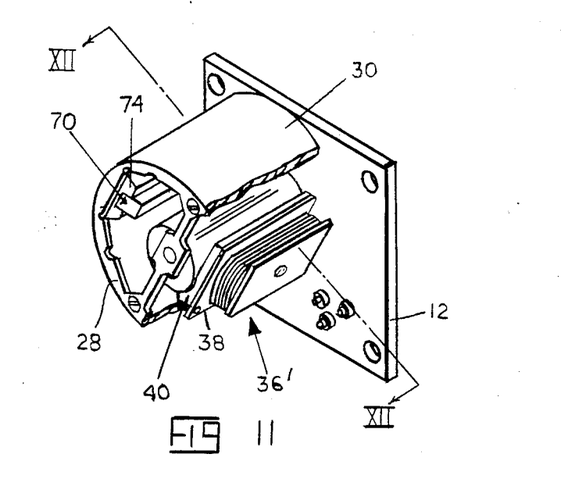
FIG. 11 is a front perspective view similar to that of FIG. 1 showing a single position latching actuator, with fail safe features, embodying the present invention.
Figure 12:
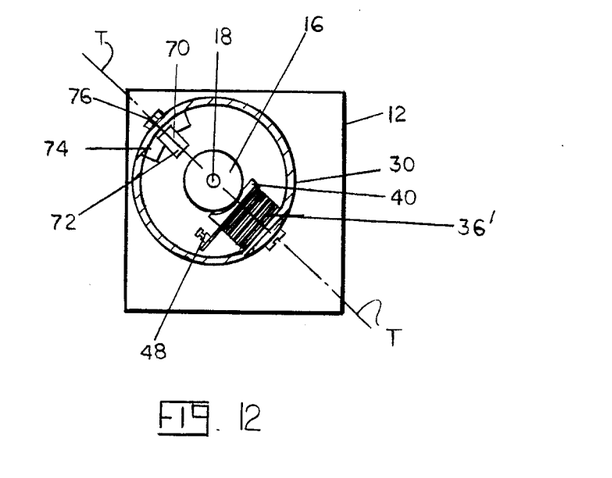
FIG. 12 is a transverse sectional view taken in the direction of XII—XII of FIG. 11.

As shown in FIG. 10, each coil 46 is connected at each of its ends to a source of current such as a battery 47 via contacts 48 mounted on the base 12 (FIG. 2), and switch means 49 so that they might be separately driven, providing the faces 40 of each of the electromagnet stators with a selectively induced polarity. By selecting the polarity of one or both electromagnet stators which are set at 180 degrees apart, to either repel or attract the armature 16, the armature 16 can be made to rotate.

Figure 3:
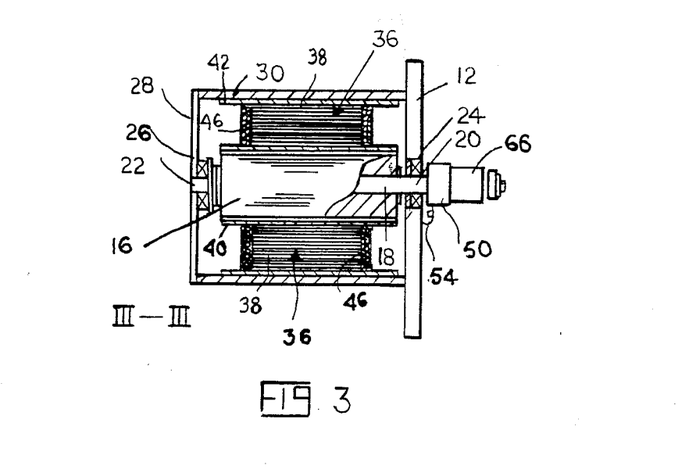
FIG. 3 is a longitudinal sectional view of the actuator shown in FIG. 1 taken along line III—III of FIG. 1.
Figure 4:
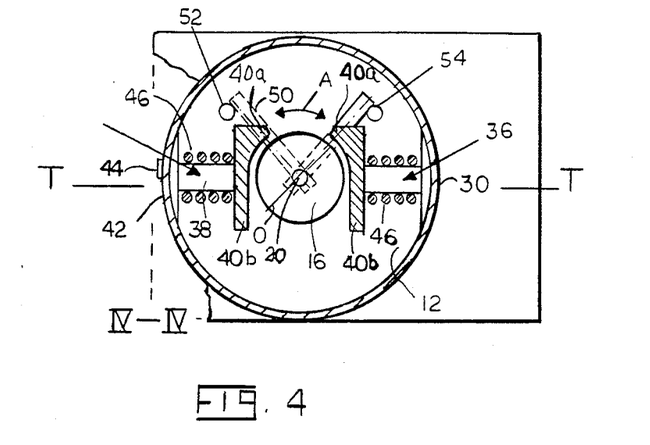
FIG. 4 is a transverse sectional view of the actuator shown in FIG. 1, greatly enlarged, taken along lines IV—IV of FIG. 1, and partially sectioned to show the components on the rear.
Figure 5:
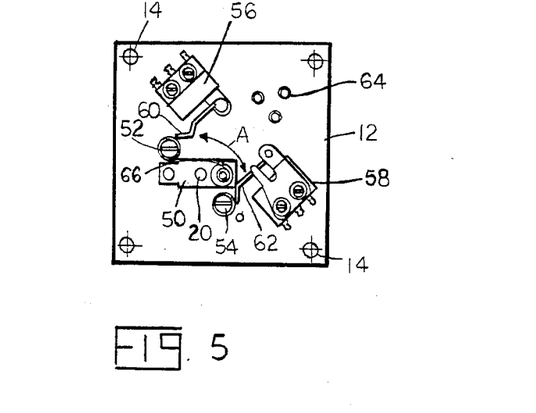
FIG. 5 is a rear plan view of the rear of the device shown in FIG. 1.

As seen more clearly in FIGS. 3-5, a drive arm 50 is fixedly secured to the exposed end of the stub axle 20 on the rear of the base 12, so that the drive arm 50 moves conjointly with the rotation of the armature 16 between the right and left stator positions. Spaced to either side of the drive arm in alignment with the stub axle 20 are a pair of stop pins 52 and 54 so that they limit the swing of the drive arm 50 to an arcuate or angular displacement (arrow A), the range of which is less than 180 degrees so as to prevent registration with the stator axis of magnetization and within a range preferably not exceeding 90 degrees.

Mounted to the base 12, adjacent each of the end positions of the drive arm 50, are a pair of micro-switches 56 and 58 being a part of an external circuit (not shown) as for example, a microwave circuit or machine or tool system. The micro switches 56 and 58 are arranged so that their actuating spring contacts 60 and 62 respectively are depressed to actuate their respective switch when the drive arm 50 reaches the limits of its respective stop positions. The micro-switches 56 and 58 are conventional and commercially available and do not require further explanation here. In lieu of micro-switches, other contact means or the like can be provided. Mounted also on the base 12 are a plurality of electrical terminals and/or contacts 64 enabling suitable wiring of the coils 46 of the electromagnetic stators 36 and of the micro-switches 56 and 58 to a source of current and to the circuits in which they might be located.

While two micro-switches are shown it will be obvious that only one may be employed or one or both replaced with some other electrical or mechanical circuit element which may be activated or operated by contact with the drive arm 50. The switch means may also be used to interrupt flow of electric current to the selected electromagnetic stator, once the armature is fully rotated, thereby terminating application of electrical energy to the stator when such current is no longer required. This results in a reduction of generated heat and an increase in the life span of the actuator.

Figure 6:
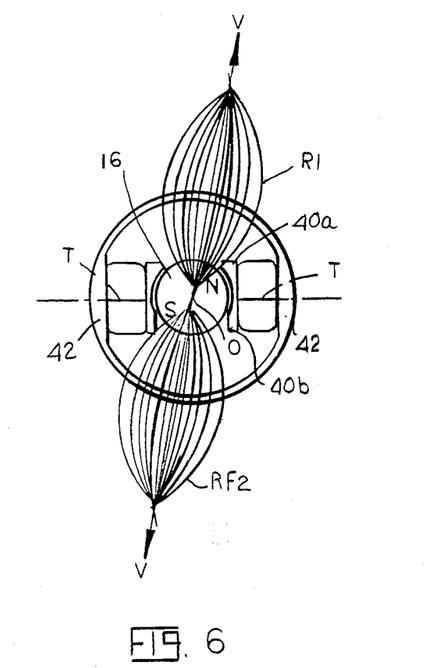
FIG. 6 is a schematic representation of the magnetic flux field created by the rotor of the actuator shown in FIG. 1.

As noted earlier, the essentially round elongated armature 16 comprises a permanent cylindrical magnet having its opposing poles lengthwise along its diametrically opposed sides and magnetically fixed with positive and inverse polarity, illustrated in FIGS. 6-9 conventionally by the letters N and S. The North (N) and South (S) poles are opposed to each other on a diametric polar axis O and are initially installed between the electromagnetic stators 36 to extend along the length of the armature 16 perpendicularly to the common axis of magnetization T of the electromagnet stators 36 so that the armature 16 can swing 45 degrees to either side of a mid-position between the right and left pole faces 40. As shown in FIG. 6, the permanently magnetized armature 16 produces two diametrically spaced rotor fields $RF_1$, $RF_2$, each in the shape of a longitudinally elongated ellipsoid, having a force vector V which extends in a straight line coincident with the polar axis O.

The inner face 40 of each core 38 is asymmetrically shaped with respect to the axis of magnetization T having an enlarged upper pole segment 40a, which curves and extends, and circumferentially encompasses about an arcuate portion of the armature 16 for a distance preferably between 15 and 30 degrees. The smaller lower segment 40b of the inner face 40 is narrower being shaved to be relatively flat and trailing away and spaced from the armature. The cores are arranged so that the larger arcuately extending segments 40a are on the same side of the common axis of magnetization. This arrangemet enables the encompassing inner face 40 to be mounted unusually close to the armature to reduce the air gap therebetween and as small as 0.001. This is important as it reduces the degree of reluctance caused by the air gap on the magnetic field between the faces of the core 38 and the surface of armature 16. This results in a reduction of the power requirements for production of the stator field. In practice, although the air gap between the face 40 and the armature may be between 0.001" and 0.025" the preferred space is between 0.005" and 0.010". By reducing and narrowing the face 40 at its pole 40b, remote from the enlarged pole 40a, the magnetic flux is concentrated in the area of the enlarged pole 40a as will be described.

In the rest or inoperative position of the actuator as seen in FIG. 6, wherein neither electromagnetic stator is driven, the armature 16 is automatically latched or in normal biased attraction to the nearest electromagnetic stator 36. This latching is due to the fact that a considerable segment of the ellipsoidal pole field $RF_1$ intercepts the larger segment 40a of the nearest core face 40. In the absence of any external field force or other biasing factors such as springs (none of which are required or desirable in the present invention) to influence the movement of the armature 16, latching occurs normally and automatically between the magnetic pole of the armature 16 and the closest face 40a of a electromagnetic stator 36. The position shown in FIG. 6, therefore, is illustrative only of the latching effect. It will be understood, that latching can equally take place on the other or opposing electromagnetic stator had the pole of the armature 16 on the same side of the large segment 40b been initially located closer to it.

Figure 7:
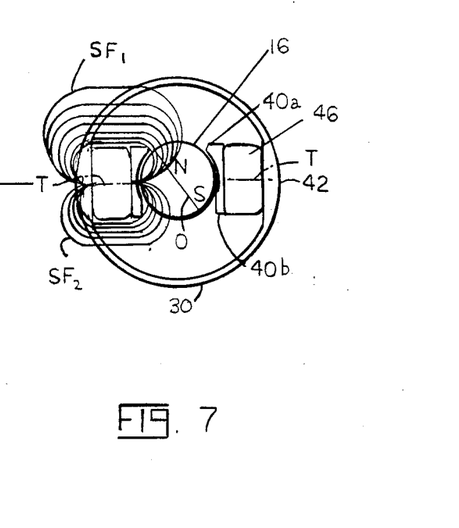
FIG. 7 is a schematic representation showing the magnetic flux field produced by the driven electromagnetic stator of the actuator shown in FIG. 1.

As seen in FIG. 7, the electromagnet coil 46 is arranged on each core 38 so that it produces in each face 40 and 42 first and second poles, respectively, of opposite polarity to the other. Depending upon the direction of the current impressed in the winding, a positive or North polarity will be induced on the inner face 40 and a negative or South polarity on the outer face 42. Thus, each electromagnetic stator 36 can be provided selectively with either a north or south polarity adjacent to the armature 16. Since the axis of magnetization T of the electromagnetic stator 36 extends in the transverse direction to the intersecting polar axis O of the armature 16, passing through the center of the armature (FIGS. 6 and 7), a pair of stator flux fields (SF) are produced. Each electromagnetic stator 36 provides a larger and stronger stator field SF1 above on the sides of the axis of the magnetization T in the area of the large pole 40a and a smaller, weaker stator field SF2 on the side of the axis of the magnetization T in the area of the narrowed end 40b, remote from the larger core segment 40a.

Referring to FIG. 7, it will be seen that because of the larger stator flux field SF1 concentrated about the larger core segment 40a, above the axis of magnetization T of the stators 36, the magnetic force exerted upon the pole of the armature 16 in the area of the pole 40a is significantly greater than the force exerted on the armature pole in the area of the shaved or narrowed pole 40b. The reduction of that segment 40b of the inner face 40 below the axis of magnetization T, significantly reduces the amount of magnetic flux insecting the armature field $RF_2$ produced by the lower armature pole in its area so that the resultant difference in exerted force on the opposed armature poles N and S produces a larger torque on the armature than would be normally expected. Consequently, the speed of rotation is greatly increased.

Figure 8:
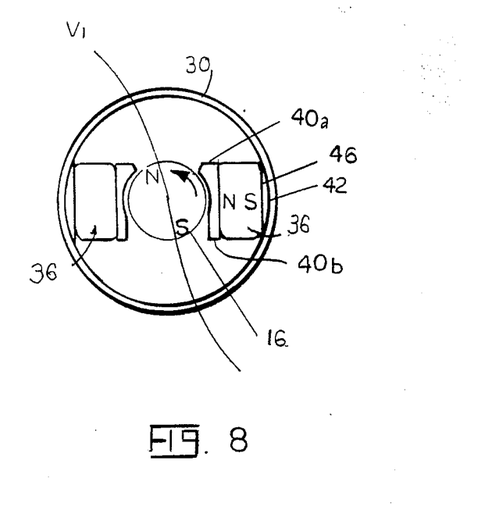
FIG. 8 is a schematic representation illustrating the operation of the actuator of FIG. 1 and the force Vector produced by the cooperation of the rotor and a driven one of the electromagnetic stators.
Figure 9:
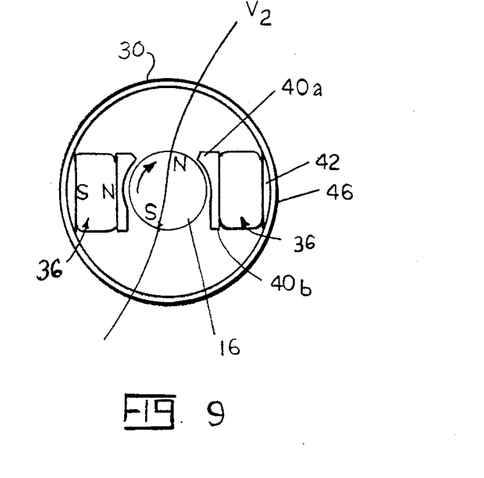
FIG. 9 is a view similar to that of FIG. 8 showing the operation on driving of the opposite electromagnetic stator.

In operation, as seen in FIGS. 8 and 9, the combination of the permanent armature flux fields $RF_1$ and $RF_2$ (having the north and south polarities shown in the figures and a positive (N) polarity stator flux field SF from the selectively driven electromagnetic stators 36 produces a turning moment in the armature 16, by producing mutually repelling force having force vectors V1 and V2 (FIGS. 8 and 9) depending on which stator is driven. As a result the freely rotatable armature can be made to rotate counter-clockwise or clockwise. Once set in motion, the freely rotatable armature 16 would tend to continue its rotation until its polar axis O is coincident with the axis of magnetization T. Thus, if left uninhibited the armature would have a swing of 180 degrees between the opposed electromagnetic stators. However, the extent of the swing of the armature 16 is limited, by the engagement of the drive arm 50 with one of the mechanical stop means 52, 54, to the preferred arc of approximately 90 degrees. This reduces the time of traverse between the terminal stop positions 52 and 54. Once the armature 16 passes the center Point of the arc A (FIG. 4 and 5), i.e., when the armature polar axis O is beyond the perpendicular to the axis of magnetization T, attraction between the armature 16 and the then nearest stator 36 becomes automatic even if the repulsion force on the driving electromagnetic stator is withdrawn.

Consequently, the period during which the selected stator 36 must be energized to effect movement of the armature may be extremely small, giving rise to an overall quick-acting actuator. The electric circuit shown in FIG. 10 for energizing the stators 36, illustrates another advantageous feature which can be incorporated into the present device as a result of the use of the asymmetrical core 40, and the production of asymmetrical stator fields which provides for the automatic latching feature even in the absence of driving power. A simple timer 68 (either mechanical or solid state device) can be inserted in the drive circuit so that power is applied to the respective coil 46 only for that small milli-second period needed to create the N polarity necessary to repel the armature 16 over the dead center position. By limiting the drive power to this small time period, hard contact between drive arm 50 and stop 52, 54 can be avoided, and chattering or vibration obviated. In addition, the heat generated in the coil 46 is reduced since the coils are driven for only a short time.

It has been found that driving the selected electromagnetic stators to produce in its inner core face 40a a repelling polarity, i.e., a polarity the same as that of the armature pole on the corresponding side of the common axis of magnetization T, provides the best results, as the torque created in the armature 16 by such repulsion acts quickly and with certainty to rotate the armature 16. In addition, the power needed to repel is significantly less than the power needed to attract. Consequently, a construction without any spring biasing means is possible to effect precise and rapid latching.

The force and the speed at which the armature 16 may be made to rotate may be increased by simultaneously activating both of the opposed electromagnetic stators with relatively opposite polarity on their inner core faces 40 so that one stator 36 attracts the armature 16 while the other repels the armature 16 in the same direction, thus increasing the torque of the armature. Since in this mode of operation, the attracting electromagnetic stator has only an auxiliary function, the power required to drive it may be significantly less. On the other hand, there should be very few instances where the small increase in speed is practically necessary. Furthermore, it would also serve very little purpose to attempt to create balanced field forces on the armature 16 by driving both electromagnetic stators 36 so as to produce in each of the inner core faces 40 the same polarity since it is virtually impossible to create fields in both stators of identical value.

It is preferred to form the housing 30 of ferrous metal or magnetizable material as it would help in assuring latching, i.e., the fixed attraction between the armature 16 and the stators 36, with or without electrical driving of the electromagnetic stators 36. A magnetizable housing 30 would complement the soft iron core 38 and provide a magnetic loop for the armature flux field RF so as to conduct and concentrate the flux pattern in close proximity to the armature. For this reason, as well as to provide a strong housing, it is preferred that the housing also is formed with a relatively thick wall.

In FIG. 11-14, a two-pole single position latching actuator is shown, i.e., an actuator having a "fail-safe" return to a single fixed position when power is withdrawn. The overall function of this embodiment is to provide for rotation of the armature 16 in response to the driving of a single electromagnetic stator 36, from an initial fixed position to a second operational position and in holding the armature in the second operational position only so long as the driven electromagnetic stator is energized and immediately upon the withdrawal of the current to this electromagnetic stator, the armature 16 will automatically return into its initial fixed position. In this respect, this embodiment provides a "fail-safe" operation in that the armature 16 and its conjointly mounted drive arm 50 always returns to the initial predetermined position, i.e., the rest condition, in the absence of an electromotive driving force.

Figure 13:
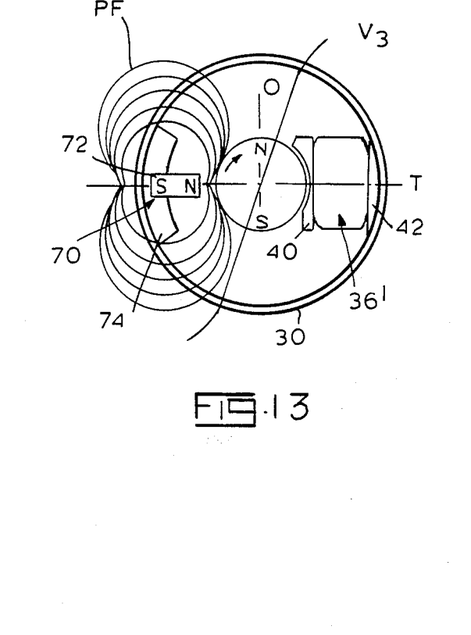
FIG. 13 is a schematic representation of the device shown in FIG. 11 illustrating the magnetic force field in the rest or single position latching but rotated 180 degrees.

As seen in FIGS. 11-14, an actuator is provided having a construction almost identical to the earlier described embodiment and the same numerals identify the same parts, as shown in the earlier described embodiment, both structurally as well as functionally. The "fail-safe" embodiment shown in these figures differs, however, from the earlier embodiment, in that only one of the electromagnetic stators, here denoted 36 is retained while the other stator is replaced with a permanent magnet, generally designated by the numeral 70. The permanent magnet 70 comprises a magnet bar 72 set in a magnetizable supporting shoe 74, preferably by a non magnetic adhesive, and the shoe 74 is held to the housing 30 by a screw 76. The permanent magnetic bar 72, extends along the length of the armature 16 in diametric opposition to the remaining electromagnetic stator 36', and has opposed poles N and S of fixed, opposite polarity, along its longitudinal edges, which lie in the transverse axis of magnetization T, and produce a permanent flux field PF, as seen in FIG. 13, which is enhanced by the shoe 74.

As in the first embodiment, the armature 16 is provided with fixed poles diametrically opposed to each other and nominally designated in the same manner N and S. The permanently magnetized bar 72 is arranged with an N pole adjacent the armature 16 so that a repulsion force is constantly applied to the armature pole N lying on the side of the axis of magnetization T on which the larger pole portion 40a is located. This constant repelling force biases the armature 16 into the latching position against the single electromagnetic stator 36. As seen in FIG. 13, the flux field PF of the permanently magnetized bar 72 is symmetrical both above and below the axis of magnetization T. As a result the force Vector V3 produced on the freely rotatable armature 16, the armature 16 is normally biased away from the permanent magnet 70 not only by the repulsion acting on the armature N pole but by the simultaneous attraction between its S pole and the permanent magnet 70.

Figure 14:
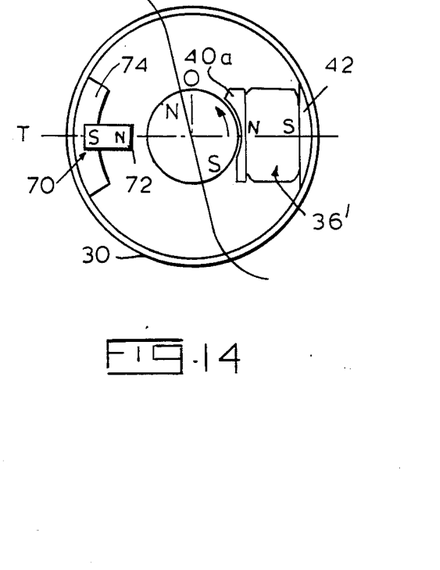
FIG. 14 is a schematic representation showing the force vector on driving of the electromagnet of FIG. 11 but rotated 180 degrees.

As seen in FIG. 14, the driving of the single electromagnetic stator 36', so as to provide its inner core face 40 with an N pole causes a force Vector V4 which produces clockwise rotation of the armature 16 toward the permanent magnet 70 by repelling the N pole of the armature lying on the side of the enlarged stator pole portion 40a. It will be appreciated that the force field created by the electromagnetic stator 36 in this embodiment (not specifically shown in FIGS. 13 or 14) is identical to the asymmetrical force field SF shown in FIG. 7 wherein the field induced by the larger pole portion 40a is substantially greater than that produced by the lower pole portion 40b. These forces are nevertheless sufficient to overcome the constant counter repelling force created by the N pole of the permanently magnet 70 and there is no inhibition to the immediate rotation of the armature 16 toward the permanent magnet 70 upon activation of the electromagnetic stator 36. On the other hand, upon the withdrawal of current to the electromagnetic stator 36', the stator force field is removed, and the repulsion between the N pole of the armature 16 and the N pole of the permanent magnet 70 is immediately effective to swing the armature 16 counter-clockwise back into the stator 36' as shown in FIG. 13, thus creating the fail-safe aspect and single position latching of this embodiment.

From the foregoing it will be seen that in both embodiments, a simple, springless, small and lightweight rotary actuator or sector motor is constructed, having instantaneous response to the impression and removal of the driving power. With the present invention actuators operating in 50 milli-seconds or less, delivering over one million cycles can be built, using 12 to 40 Volt AC or DC current.

Various changes, modifications, as well as embodiments have been shown and described. Since these, as

What is claimed is:

1. In an actuator having a cylindrical permanent magnet armature provided with diametrically opposed poles of opposite polarity mounted between a pair of diametrically opposed stators to be reciprocably pivotal about the central axis between said stators on creation of a selected magnetic flux pattern in at least one of said stators the improvement comprising forming said at least one of said stators as a electromagnet having a core extending parallel to the central axis along the length of said armature, and having a longitudinal surface facing said armature a winding wound about said core to provide said one surface with a selected polarity, said one surface being shaped to increase the magnetic flux field along the longitudinal edge of said one surface in the vicinity of the correspondingly located one of the opposed poles of said armature and reduce the magnetic flux field along the longitudinal edge of the one surface in the vicinity of the other one of the opposed poles of said armature, to provide a greater flux field with a polarity coacting with the polarity of the correspondingly located pole of said armature to cause pivoting of said armature, between said stators.

2. In the actuator according to claim 1, wherein said core of said electromagnetic stator is formed with a segment extending arcuately around the armature in a circumferential direction toward said one of the opposed poles of said armature and an opposing narrowed segment having a surface directed away and spaced from said armature.

3. In the actuator according to claim 2, arranging a pair of said electromagnetic stators in opposition to each other with their cores lying along a common axis and arranging the cores so that the arcuately extending segments on said poles lie on the same side of said common axis, and producing a flux field in a selected one of said electromagnets.

4. In the actuator according to anyone of claims 1-3 wherein one stator element comprises an electromagnet and the other stator a permanent bar magnet arranged in opposition to each other along the length of said armature with their poles lying along a common asix, the polarity of said permanent bar magnet being arranged so that its flux field normally causes said aramture to rotate into magnetic coaction with the core of said electromagnetic stator in the absence of a flux field induced in said electromagnetic stator.

5. In the actuator according to claim 4, providing stop means for limiting the rotation of said armature within an angular range of less than 180 degrees to thereby prevent the poles of said armature from magnetic registration with said stator elements.

6. In the actuator according to claim 5, providing said armature with a radially extending arm swingable conjointly with rotation of said armature between said spaced stop means, and electric circuit means located adjacent each stop means operable on contact by said radially extending arm reaching the limit of rotation.

7. In the actuator according to claim 5, wherein the longitudinal edge of said core is spaced from said armature between 0.001" and 0.025" and preferably between 0.005" and 0.010" to thereby enable the reduction of electrical energy required to rotate said armature.

8. A rotary actuator comprising a pair of stators fixedly mounted in spaced opposition to each other having first and second poles lying along a common axis of magnetization an armature comprising a cylindrical permanent magnet having opposed first and second fixed poles of positive and inverse polarity respectively along a diametric polar axis, said armature being mounted between said opposed stators to be reciprocably pivotable about its central axis and with the diametric polar axis generally transverse to the common axis of magnetization of said stators, at least one of said stators comprising an electromagnet having a non-permanent magnetizeable core disposed parallel to the central axis as to provide longitudinally extending first and second stator poles, and a winding parallel to the central axis to provide said first and second stator poles, with opposite polarity, the core of said stator being asymmetrically shaped with respect to the common axis of magnetization to provide a greater force field to one side and a lesser force field on the other side of the common axis of magnetization, and an electric circuit for energizing a selected one of said stators to induce on said first and second stator poles thereof positive and inverse polarity respectively thus causing the selected stator to attract or to repel the fixed pole of said armature magnet on the corresponding side of said greater force field to thereby pivot said armature from one to the other of said stators.

9. The actuator according to claim 8, including a pair of electromagnetic stators each having an asymmetrically shaped core arranged on the same side of said common axis of magnetization, the cores of each of said stators being closely spaced from the surface of said armature to normally attract the fixed pole of said armature located in the vicinity thereof, thereby magnetically latching said armature to the core of the stator nearest to said fixed poles of said armature in the absence of an electric current.

10. The actuator according to claim 8, wherein one of said stators comprises a permanent magnet extending along the length of the said armature, having poles of opposite polarity along its longitudinal edges, and the polarity along the edge adjacent the armature is such as to cause rotation of said armature toward the electromagnetic stator.

11. The actuator according to any one of claims 8-10, including a cylindrical housing closed at one end and surrounding said stators concentric with the central axis of said armature, a base closing the other end of said housing, means located on the closed one end of said housing and said base to journal said armature, and means for securing said stators to the inner wall of said housing to maintain said stators in fixed spaced relationship to said armature.

12. The actuator according to claim 11, wherein said housing is formed of magnetizable material to concentrate and conduct the flux pattern produced by said electromagnetic stators in close proximity to said armature.

13. The actuator according to claim 12, wherein each core of said stators comprises a rectangular body having a length extending parallel to said armature, a coextensive inner face spaced closely to the surface of said armature and an outer face secured to the inner wall of said housing, and said winding is wound between said inner and outer face along the length of said body.

14. The actuator accordin9 to claim 8, wherein the inner face of said core is asymmetrical in cross-section with respect to the common axis of magnetization, having an enlarged segment to one side of said common axis of magnetization and a narrower segment to the other side of said common axis of magnetization.

15. The actuator according to claim 14, wherein said enlarged segment of said core curves and extends circumferentially about an arcuate portion of said armature.

16. The actuator according to claim 15, wherein the arcuate portion of said core is between 15 and 30 degrees and wherein the space between said core and said armature is 0.001" and 0.025" and preferably between 0.005" and 0.010".

17. The actuator according to claim 15, wherein the narrower segment of the inner face of said core is flat and extends tangentially away from said armature.

18. The actuator according to claim 11, including means for limiting the rotation of said armature comprising a lever fixed to said armature and extending radially from the central axis thereof to swing conjoint therewith, and plural stop means fixedly mounted on the base of said housing, said stop means being spaced from each other permitting said lever to swing within a range of not exceeding 90 degrees.

19. The actuator according to claim 18, including switch means connected within an operational circuit external of the rotary actuator, said switch means being located adjacent at least one of said stop means to be actuated by contact with said lever approaching said stop means.

20. A rotary actuator comprising a cylindrical permanently magnetized armature freely rotatable about its central axis and having fixed poles of opposite polarity lying in a diametric polar axis, an electromagnetic stator and a permanent magnet mounted in opposition to each other adjacent to and along the length of said armature, said electromagnetic stators comprising a core formed of non-permanent magnetizable material disposed parallel to the central axis so as to provide longitudinal edges and a winding arranged about said core to produce poles of opposite polarity on each of longitudinal edges along an axis extending transversely to the length of said core, the core of said electromagnetic stator being asymmetrically shaped so as to produce, when said stator is impressed with a current, an increased flux pattern intersecting one of the armature poles and a decreased flux pattern intersecting the other, said permanent magnet disposed parallel to the central axis so as to provide longitudinal edges having poles of opposite polarity along its longitudinal edges, the polarity along the edge adjacent the armature producing a continuous repelling magnetic flux field on the one pole of said armature located in the corresponding area of the increased magnetic flux field causing said armature to be normally biased toward said electromagnetic stator, means for impressing on said electromagnetic stator an electric current to temporarily produce magnetic poles therein of a selected polarity greater than said continuous magnetic flux field of said permanent magnet to cause counter-repulsion of said armature away from said electromagnetic stator, and means for limiting the rotation of said armature in each of the biased and counter-repelled movements to a fixed position.

21. A rotary actuator comprising a cylindrical permanently magnetized armature freely rotatable about its central axis and having fixed poles of opposite polarity in a diametric polar axis, a pair of electromagnetic stators mounted in opposition to each other along the length of said armature, each of said stators comprising a core formed of non-permanent magnetizable material disposed parallel to the central axis so as to provide longitudinal edges and a winding arranged about said core to produce magnetic poles of opposite polarity along a common axis extending transversely to the diametric polar axis of said armature, the core of each of said electromagnetic stators being asymmetrically shaped so as to produce, when said stator is impressed with an electric current, a greater magnetic flux pattern intersecting one of the armature magentic poles than intersecting the other, and means for impressing on a selected one of said electromagnetic stators an electric current to produce magnetic poles therein of a selected polarity to repel or attract the magnetic pole of the armature located adjacent the larger magnetic flux field causing clockwise or counter-clockwise rotation of said armature about its central axis, and means for limiting the rotation of said armature in each of the clockwise and counter-clockwise movements to a fixed position.

* * * * *